(12) United States Patent
Medeiros et al.

(10) Patent No.: US 11,353,911 B2
(45) Date of Patent: Jun. 7, 2022

(54) PEDAL ASSEMBLY

(71) Applicant: VENTRA GROUP, CO., Halifax (CA)

(72) Inventors: Andrew Medeiros, Halifax (CA); Haththella Upathilake, Halifax (CA); Ron Prentice, Halifax (CA)

(73) Assignee: VENTRA GROUP CO., Halifax (CA)

( * ) Notice: Subject to any disclaimer, the term of this patent is extended or adjusted under 35 U.S.C. 154(b) by 0 days.

(21) Appl. No.: 17/155,823

(22) Filed: Jan. 22, 2021

(65) Prior Publication Data

US 2021/0232173 A1    Jul. 29, 2021

Related U.S. Application Data

(60) Provisional application No. 62/964,701, filed on Jan. 23, 2020.

(51) Int. Cl.
| | |
|---|---|
| *G05G 1/44* | (2008.04) |
| *G05G 1/38* | (2008.04) |
| *G05G 1/50* | (2008.04) |
| *B60T 7/04* | (2006.01) |
| *B60K 23/02* | (2006.01) |
| *B60K 26/02* | (2006.01) |
| *B60T 7/06* | (2006.01) |

(52) U.S. Cl.
CPC .............. *G05G 1/44* (2013.01); *G05G 1/38* (2013.01); *G05G 1/506* (2013.01); *B60K 23/02* (2013.01); *B60K 26/02* (2013.01); *B60T 7/042* (2013.01); *B60T 7/06* (2013.01)

(58) Field of Classification Search
CPC ............ G05G 1/44; G05G 1/38; G05G 1/506
See application file for complete search history.

(56) References Cited

U.S. PATENT DOCUMENTS

| | | |
|---|---|---|
| 5,416,295 A | 5/1995 | White et al. |
| 5,768,946 A | 6/1998 | Fromer et al. |
| 6,019,016 A | 2/2000 | Takagi et al. |
| 6,860,170 B2 | 3/2005 | Deforest |
| 8,240,230 B2 | 8/2012 | Peniston et al. |
| 9,134,748 B2 | 9/2015 | Fujiwara |

(Continued)

FOREIGN PATENT DOCUMENTS

| | | | |
|---|---|---|---|
| EP | 1914615 A1 | 4/2008 | |
| WO | WO-0036307 A1 * | 6/2000 | .............. F16C 11/02 |

*Primary Examiner* — Vicky A Johnson
(74) *Attorney, Agent, or Firm* — Pillsbury Winthrop Shaw Pittman, LLP

(57) ABSTRACT

A pedal assembly comprises a pedal arm; a pedal plate; a vehicle mounting bracket; a pivot pin receiving member; and a pivot pin. A first end of the pedal arm is operatively connected to the pivot pin receiving member to provide pivotal movement to the pivot pin receiving member during movement of the pedal arm between first and second arm positions. The pivot pin is at least partially and axially received by the pivot pin receiving member. The pivot pin receiving member and the pivot pin are mechanically coupled to one another via an interlock connection therebetween to simultaneously pivot together about the pivot axis as a unit during movement of the pedal arm between the first and second arm positions. At least a portion of the pivot pin receiving member or the pivot pin is deformed to form the interlock connection therebetween.

13 Claims, 4 Drawing Sheets

(56) References Cited

U.S. PATENT DOCUMENTS

| | | | |
|---|---|---|---|
| 9,389,633 B2* | 7/2016 | Burguera Albizuri | F16B 21/02 |
| 9,434,253 B2 | 9/2016 | Arigaya et al. | |
| 9,676,375 B2 | 6/2017 | Matsuoka et al. | |
| 9,889,826 B2 | 2/2018 | Periasamy et al. | |
| 10,112,587 B2 | 10/2018 | Richards et al. | |
| 2009/0100959 A1 | 4/2009 | Galea et al. | |
| 2012/0137823 A1* | 6/2012 | Kim | G05G 1/32 |
| | | | 74/560 |

* cited by examiner

PEDAL ASSEMBLY

CROSS-REFERENCE TO RELATED APPLICATIONS

This application claims priority to U.S. Provisional Application No. 62/964,701, filed Jan. 23, 2020, the subject matter of which is incorporated herein by reference in entirety.

BACKGROUND

Field

The present patent application relates to a pedal assembly for operating a push rod that activates a functional system of a motor vehicle.

Description of Related Art

Actuating assemblies for operating input elements of vehicles are well-known and include assemblies such as pedal assemblies. A pedal, such as a brake pedal, is mounted to a dash panel or a firewall in a passenger compartment of a vehicle so as to provide a driver easy access to and manipulation of the pedal via his/her foot. For example, known brake pedal assemblies include a pedal arm having one end that is pivotally mounted to a mounting structure (e.g., a bracket) provided in the vehicle to enable pivotal movement of the pedal arm about an operating pivot axis.

Switch plungers require the pedal to have switch brackets and switch flags to be added to the brake pedal assembly, which requires tight tolerances for sensor accuracy. Pedal position sensors require modifications to the pedal housing or an added bracket and pin to the brake pedal assembly.

Consequently, it would be advantageous to provide an improved pedal assembly that obviates the shortcomings associated with the prior art pedal assemblies discussed above.

BRIEF SUMMARY

In one embodiment of the present patent application, a pedal assembly for operating a push rod that activates a functional system of a vehicle is provided. The pedal assembly comprises a pedal arm; a pedal plate; a vehicle mounting bracket; a pivot pin receiving member; and a pivot pin. The pedal arm comprises an elongated lever structure with a first end and a second end and is configured for movement between a first arm position and a second arm position. The pedal plate is provided on the second end of the elongated lever structure of the pedal arm for depression by a foot of a driver of the vehicle. The pivot pin receiving member is configured for pivoting relative to the vehicle mounting bracket about a pivot axis. The first end of the pedal arm is operatively connected to the pivot pin receiving member to provide pivotal movement to the pivot pin receiving member during movement of the pedal arm between the first arm position and the second arm position. The pivot pin is at least partially and axially received by the pivot pin receiving member and is configured to pivotally connect the pedal arm and the vehicle mounting bracket. The pivot pin receiving member and the pivot pin are mechanically coupled to one another via an interlock connection therebetween to simultaneously pivot together about the pivot axis as a unit during movement of the pedal arm between the first arm position and the second arm position. At least a portion of the pivot pin receiving member or the pivot pin is deformed to form the interlock connection between the pivot pin receiving member and the pivot pin.

In another embodiment of the present patent application, a method of assembling a pedal assembly is provided. The pedal assembly comprises a pedal arm, a pedal plate, a vehicle mounting bracket, a pivot pin receiving member, and a pivot pin. The pedal arm comprises an elongated lever structure with a first end and a second end and configured for movement between a first arm position and a second arm position. The pedal plate is provided on the second end of the elongated lever structure of the pedal arm for depression by a foot of a driver of the vehicle. The vehicle mounting bracket comprises spaced-apart walls with openings formed therein. The pivot pin receiving member is configured for pivoting relative to the vehicle mounting bracket about a pivot axis. The pivot pin is configured to pivotally connect the pedal arm and the vehicle mounting bracket. The method comprises connecting the first end of the pedal arm to the pivot pin receiving member to provide pivotal movement to the pivot pin receiving member during movement of the pedal arm between the first arm position and the second arm position; disposing the pivot pin receiving member between the walls of the vehicle mounting bracket such that an opening of the pivot pin receiving member is aligned with the openings in the walls; inserting the pivot pin into the pivot pin receiving member along an axial direction of the pivot pin and through the aligned openings in the walls and the opening of the pivot pin receiving member such that an interlock connection portion of one of the pivot pin and the pivot pin receiving member deforms an interlock connection portion of the other of the pivot pin and the pivot pin receiving member to form an interlock connection between the pivot pin receiving member and the pivot pin.

These and other aspects of the present patent application, as well as the methods of operation and functions of the related elements of structure and the combination of parts and economies of manufacture, will become more apparent upon consideration of the following description with reference to the accompanying drawings, all of which form a part of this specification, wherein like reference numerals designate corresponding parts in the various figures. In one embodiment of the present patent application, the structural components illustrated herein are drawn to scale. It is to be expressly understood, however, that the drawings are for the purpose of illustration and description only and are not intended as a definition of the limits of the present patent application. It shall also be appreciated that the features of one embodiment disclosed herein can be used in other embodiments disclosed herein. As used in the specification and in the claims, the singular form of "a", "an", and "the" include plural referents unless the context clearly dictates otherwise. In addition, as used in the specification and the claims, the term "or" means "and/or" unless the context clearly dictates otherwise. It should also be appreciated that some of the components and features discussed herein may be discussed in connection with only one (singular) of such components, and that additional like components which may be disclosed herein may not be discussed in detail for the sake of reducing redundancy.

Other aspects, features, and advantages of the present patent application will become apparent from the following detailed description, the accompanying drawings, and the appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION OF THE DRAWINGS

Referring to FIGS. 1-4, a pedal assembly 10 configured to activate a functional system of a vehicle/motor vehicle is provided. The construction of the motor vehicle, and the vehicle body thereof are not considered to be part of the present patent application and thus will not be detailed herein. Instead, the present patent application is concerned in detail with the pedal assembly 10.

Figure 3:
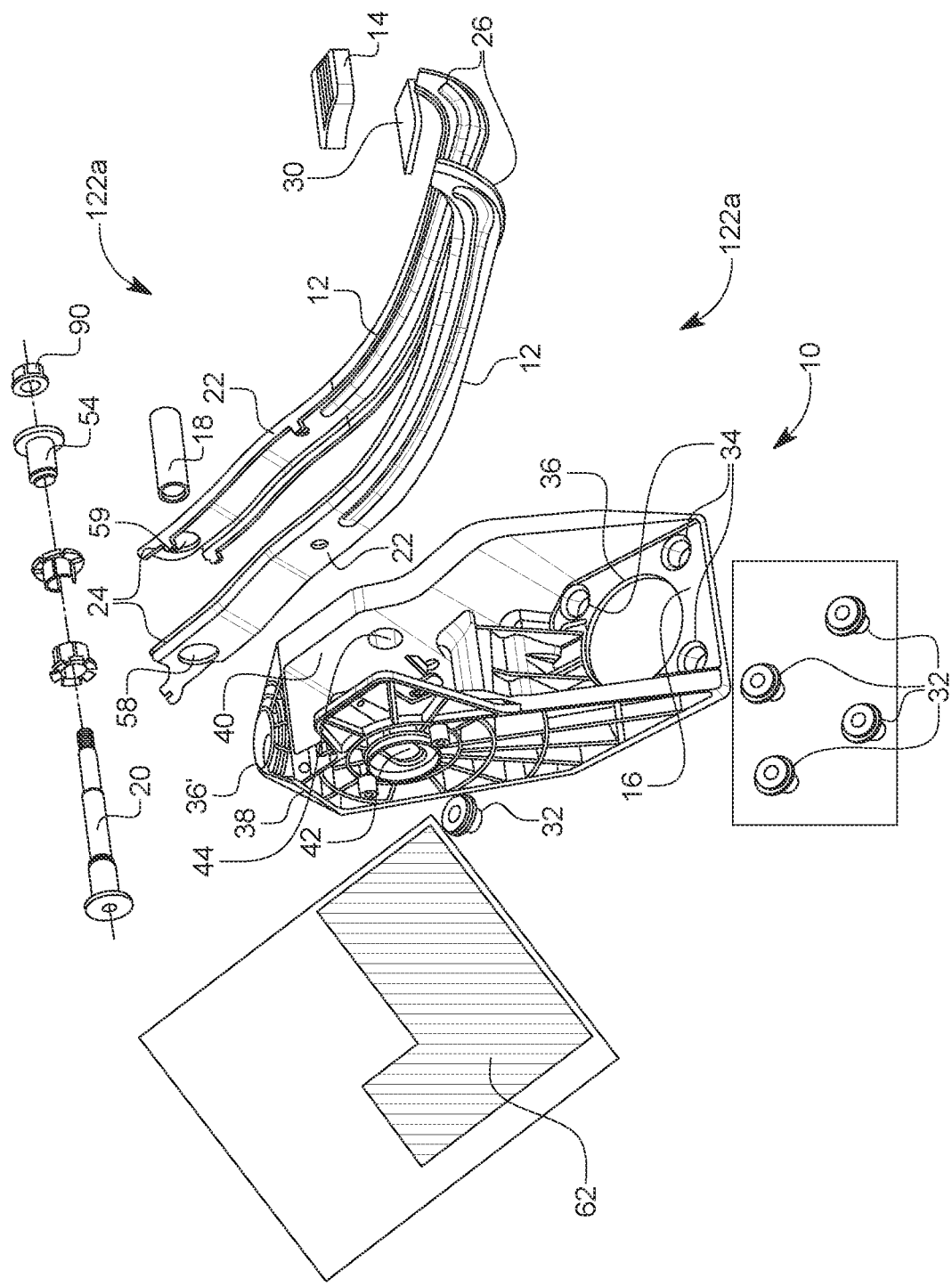
FIG. 3 shows an exploded view of the pedal assembly in accordance with an embodiment of the present patent application.

In one embodiment, the pedal assembly 10 is configured for operating a push rod that activates a functional system of a vehicle/motor vehicle. For example, a set of holes 122a (as shown in FIG. 3) are configured to serve as the connection point for the push rod. In this embodiment, the connection is a clevis pin and fork style, but, as would be appreciated by one skilled in the art, other connection methods/mechanisms such as pushrod pin/eyelet or spherical ball joint quick connection could also be used.

In another embodiment, the pedal assembly 10 is configured to communicate via wireless communication (e.g., signals) with a device that controls the brake, gas, etc. In such an embodiment, there may be no mechanical connection to a functional system of the vehicle. Also, in such an embodiment, the pedal assembly 10 (i.e., with no mechanical connection) may include a (return) spring to return the pedal to its home position. A torsion type return spring may be pivotally mounted about a pivot tube or pivot pin receiving member 18, with one end being fixed to a vehicle mounting bracket 16 and the other end being fixed to a pedal arm 12. Alternatively, an extension type return spring may be mounted directly to a hole on the vehicle mounting bracket 16 on one end, and to another feature on the pedal arm 12 such as a hole or tab.

The pedal assembly 10 comprises the pedal arm 12; a pedal plate 14; the vehicle mounting bracket 16; the pivot pin receiving member 18; and a pivot pin 20. The pedal arm 12 comprises an elongated lever structure 22 with a first (upper) end 24 and a second (lower) end 26 and is configured for movement between a first arm position and a second arm position. The pedal plate 14 is provided on the second end 26 of the elongated lever structure 22 of the pedal arm 12 for depression by a foot of a driver of the vehicle. The pivot pin receiving member 18 may be tubular, preferably cylindrical, and is configured for pivoting relative to the vehicle mounting bracket 16 about a pivot axis P-P. The first end 24 of the pedal arm 12 is operatively connected to the pivot pin receiving member 18 to provide pivotal movement to the pivot pin receiving member 18 during movement of the pedal arm 12 between the first arm position and the second arm position. The pivot pin 20 is at least partially and axially received by the pivot pin receiving member 18 and is configured to pivotally connect the pedal arm 12 and the vehicle mounting bracket 16. The pivot pin receiving member 18 and the pivot pin 20 are mechanically coupled to one another via an interlock connection 28 therebetween to simultaneously pivot together about the pivot axis P-P as a unit during movement of the pedal arm 12 between the first arm position and the second arm position. In one embodiment, at least a portion of the pivot pin receiving member 18 or the pivot pin 20 is deformed to form the interlock connection 28 between the pivot pin receiving member 18 and the pivot pin 20.

The terms "pedal", "pedal assembly", or "pedal structure" used interchangeably throughout this specification are not intended to be limit to a specific type of pedal device. It can be used for a brake pedal. The pedal may be used with any functional system (e.g., mechanical or electro-mechanical system such as a brake system, transmission) of the vehicle. The method(s) of manufacturing parts of the pedals disclosed herein are not intended to be limiting, and may include single processes and/or secondary processes. For example, parts of the disclosed pedal assembly may be manufactured or formed via stamping, molding, piercing, punching, bending, and/or manual processes. Also, the materials used to manufacture the pedal assembly should not be limiting. The pedal and its parts could be made from one or more metal(s) such as steel (tubular or blade-type), or plastic materials, for example. The parts of the pedal assembly could also be made from a combination of such materials, e.g., both metal and plastic.

Figure 1:
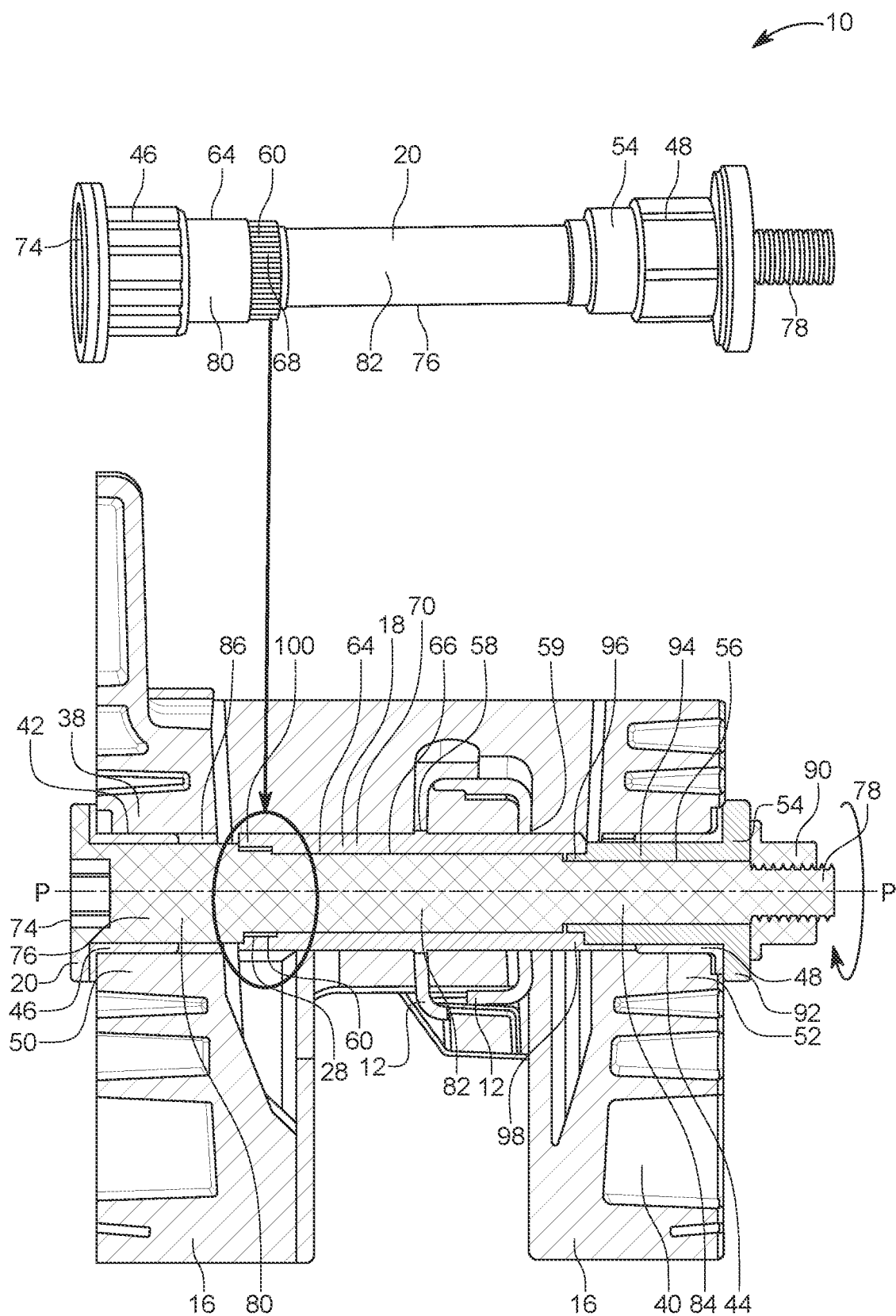
FIG. 1 shows a partial cross-sectional view of a pedal assembly configured to activate a functional system of a vehicle in accordance with an embodiment of the present patent application, wherein a detailed view of a pivot member/pin of the pedal assembly is also shown in FIG. 1.

The pedal assembly 10, shown in FIG. 1, is a brake pedal 10 connected to a brake booster (not shown). For explanatory purposes only, the pedal 10 is described with reference to a braking system, but should not be limited to such. As noted above, the pedal assembly 10 may be also connected to parts of a clutch assembly, for example. The pedal assembly 10 is provided in the vehicle such that it is easily accessible by a driver, for example, via depression by a foot of the driver. For example, in some cases, the pedal assembly 10 is mounted in relation to panels of a dashboard and/or an instrument panel. The brake booster of the brake system is fixed to the front of the dash panel or the firewall. In one embodiment, the brake booster of the brake system is connected to the pedal assembly 10 via the push rod. In one embodiment, the pedal arm 12 is configured for operating an input element (e.g., push rod) connected to the brake booster of the brake system. The herein disclosed pedal assembly 10 may include one or more intermediate links releasably connected to the push rod. For example, an intermediate link is releasably connected to an actuation link of the push rod. The push rod is connected to the pedal arm 12 of the pedal assembly 10 via these links. In another embodiment, the brake booster of the brake system is wirelessly connected (with no mechanical connection) to the pedal assembly 10. Other embodiments may include adjustable pedals, which include mechanisms whereby the pedal position may be adjusted in the vehicle for the driver's comfort as described in other portions of this patent application.

In one embodiment, the pedal arm 12 is configured for movement between the first arm position and the second arm position. In one embodiment, the first arm position is a home position where the pedal is undepressed and the second arm position is a depressed position. In one embodiment, the pedal arm 12 is configured to have one or more intermediate positions between the first arm position and the second arm position.

In one embodiment, the pedal arm 12 is a brake pedal arm configured to operate the brake booster of the brake system of the vehicle. In one embodiment, the pedal assembly 10 includes the pedal or pedal arm 12 and its associated pedal plate 14. In one embodiment, the pedal arm 12 is made of steel material. In one embodiment, the pedal arm 12 and its pedal plate 14 are welded together. In one embodiment, the pedal arm 12 is interchangeably referred to as a pedal and the pedal plate 14 is interchangeably referred to as a pedal pad.

The pedal arm 12 has the elongated pedal structure 22 that is configured to be pivotally mounted, e.g., at or near the first end 24 or along the structure 22, and has the pedal plate 14 provided on (or attached to) its second end or distal end 26 via connecting device 30. The elongated pedal structure 22 may be pivotally connected to the vehicle mounting bracket 16 via the pivot pin 20 and the pivot pin receiving member 18.

Also, the shape and design of the pedal arm 12 is not intended to be limiting. For example, in one embodiment, the pedal arm 12 can be a solid structure, a tubular structure, or include a channel in and/or along its structure (e.g., a "U"-channel shape). Other designs, mountings, and structure shapes could be implemented in the herein disclosed pedal assembly without departing from this disclosure, as would be understood to one of ordinary skill in the art.

In one embodiment, the pedal plate 14 is provided on the second end 26 of the elongated lever structure 22 of the pedal arm 12 for depression by the foot of the driver of the vehicle. The pedal plate 14 or part at the second or distal end 26 of the elongated pedal structure 22 is accessible by the driver's or user's foot such that an application of force by the driver's or user's foot may be applied thereto. During operation, the driver or user of the vehicle may apply force via his foot on the pedal plate 14 to activate a functional system of the vehicle (e.g., brake booster of a vehicle brake system). The force from the driver or user's foot is configured to cooperate with the brake booster to translate pivotal motion into a braking force to be applied to the wheels of the vehicle. Such methods for applying a braking force (and the pivotal translation) are known in the art and therefore not discussed in detail herein.

In one embodiment, for example, the push rod is configured to activate the functional system (e.g., braking device) of the vehicle. The push rod is connected to the brake booster through the vehicle structure. The push rod is configured to translate the pivoting force applied by the foot of the driver as he pushes on the pedal plate 14 to the brake booster. Generally, when force is applied to the pedal plate 14 by the foot of the user, the elongated pedal structure 22 is pivoted, which in turn pushes the push rod. That is, the push rod is pushed to operate the braking system. Generally, when force is applied, a spring or mechanism of the brake booster is compressed.

In another embodiment, the pedal assembly is configured to operate the brake booster wirelessly. That is, the pedal assembly is configured to send wireless signals to the brake booster. For example, during operation, the driver or user of the vehicle may apply force via his foot on the pedal plate 14. The pedal assembly then sends wireless signals, in response to the detected force applied on the pedal plate 14, to activate a functional system of the vehicle (e.g., brake booster of a vehicle brake system). Such an embodiment may include a force simulation/feedback device that replicates the feel of a traditional braking system.

In one embodiment, the vehicle mounting bracket 16 is made of plastic material. In another embodiment, the vehicle mounting bracket 16 is made of steel material. In one embodiment, the vehicle mounting bracket 16 is interchangeably referred to as a pedal housing.

The vehicle mounting bracket 16 may be a bracket used for mounting to the vehicle structure, using inserts 32 within its holes 34 in a mounting portion 36, and/or in cooperation with other brackets, for connecting the pedal arm 12 to the vehicle. In one embodiment, the inserts 32 are made of steel material. In one embodiment, the inserts 32 are configured to receive fasteners (e.g., screws) so that the fasteners are not threaded directly into the plastic material. In one embodiment, the inserts 32 are internally threaded to receive unshown fasteners/screws. In one embodiment, the vehicle mounting bracket 16 may be connected to a part of vehicle structure via the mounting portion 36. The vehicle mounting bracket 16 may be connected to panels of the vehicle (or the dash, in general) using conventional fastening devices such as nuts and bolts (e.g., inserts 32), or by other methods such as welding. In the illustrated embodiment of FIGS. 3 and 4, four inserts 32 are used to connect the vehicle mounting bracket 16 to a part of vehicle structure via the mounting portion 36 and one insert 32 is used to connect the vehicle mounting bracket 16 to a part of vehicle structure via second mounting portion 36'. As such, the mounting of the vehicle mounting bracket 16 to the vehicle is not meant to be limiting. Of course, the devices used and their designs are not meant to be limiting; thus, alternate designs and assemblies for connecting a pedal arm to a vehicle may be used and would not be considered beyond the scope of the present disclosure.

In one embodiment, the vehicle mounting bracket 16 includes laterally spaced-apart walls 38 and 40 with openings 42 and 44, respectively, formed therein. In one embodiment, as will be described in detail below, the pivot pin receiving member 18 is disposed between the walls 38 and 40 of the vehicle mounting bracket 16 and is aligned with the openings 42 and 44 of the walls 38 and 40 such that an opening 66 of the pivot pin receiving member 18 is aligned with the openings 42 and 44 of the walls 38 and 40. The pivot pin 20 is inserted through the aligned openings 42 and 44 of the walls 38 and 40 and the opening 66 of the pivot pin receiving member 18. The pivot pin 20 extends through the openings 42 and 44 of the walls 38 and 40.

In one embodiment, fasteners 46, 48 are disposed on sides 50, 52 of the vehicle mounting bracket 16. In one embodiment, fasteners 46, 48 are disposed on walls 40, 42 of the vehicle mounting bracket 16. In one embodiment, the fasteners 46, 48 are pivot bushings. In the illustrated embodiment, as shown in FIGS. 1 and 3, the pedal assembly 10 includes two pivot bushings 46, 48. In one embodiment, the pivot bushings 46, 48 are made of plastic material.

In one embodiments, the pivot bushings 46, 48 are configured to be fixed against rotation. In one embodiment, the pivot bushings 46, 48 are configured to prevent wear of the plastic side walls of the 42 of the vehicle mounting bracket 16.

In one embodiment, the fasteners 46, 48 are configured to interlock to the openings 42 and 44 of the vehicle mounting bracket 16 in a manner fixed against pivotal rotation, while permitting pivoting of the pivot pin 20 therein. In one embodiment, the fasteners 46, 48 of the pedal assembly 10 are located at the interface between the pivot pin 20/a pivot spacer 54 and the vehicle mounting bracket 16. That is, in one embodiment, the pivot bushings 46, 48 of the pedal assembly 10 are not radially between the pivot pin receiving member 18 and the pivot pin 20. In one embodiment, the fastener 46 is disposed between the vehicle mounting bracket 16 and the pivot pin 20 and is at the side 50 of the vehicle mounting bracket 16, and the fastener 48 is disposed between the vehicle mounting bracket 16 and the pivot spacer 54 at the other side 52 of the vehicle mounting bracket 16.

In one embodiment, one axial end of the pivot pin 20 is connected to the vehicle mounting bracket 16 using the fastener 46. At the other end of the pivot pin 20, the bushing 48 connects the pivot spacer 54 (with a least a portion of the pivot pin 20 extending through its opening 56 of the pivot spacer 54) and the vehicle mounting bracket 16.

As will be discussed in detail below, the pivot spacer 54 is configured to receive at least a portion of the pivot pin 20 in the opening 56 therethrough. In one embodiment, the pivot spacer 54 is configured to receive a third diameter portion 84 of the pivot pin 20 in the opening 56 therethrough. The pivot spacer 54 is disposed/positioned radially between the fastener 48 and the pivot pin 20 and at the side 52 of the vehicle mounting bracket 16. In one embodiment, the pivot spacer 54 of the pedal assembly 10 is configured to ensure tight fit to far side of the pivot pin receiving member 18. In one embodiment, the pivot spacer 54 of the pivot assembly 10 is configured to ensure that the pedal assembly 10 is sound. In one embodiment, the pivot spacer 54 is made of steel material.

In one embodiment, the pivot spacer 54 includes a flanged head portion 92, a shank portion 94 and a pivot pin receiving member engagement portion 96. In one embodiment, portions of the head portion 92 and the shank portion 94 are configured to engage with the pivot bushing/fastener 48. In one embodiment, the pivot pin receiving member engagement portion 96 of the pivot spacer 54 is configured to ensure tight fit/proper engagement with the pivot spacer engagement portion 98 of the pivot pin receiving member 18.

In one embodiment, the pivot pin receiving member 18 is configured for pivoting relative to the vehicle mounting bracket 16 about the pivot axis P-P. The first end 24 of the pedal arm 12 is operatively connected to the pivot pin receiving member 18 to provide pivotal movement to the pivot pin receiving member 18 during movement of the pedal arm 12 between the first arm position and the second arm position. In one embodiment, the first end 24 of the pedal arm 12 has openings 58 and 59 that are configured to receive the pivot pin receiving member 18. The pivot pin receiving member 18 is received between the walls 38 and 40 of the vehicle mounting bracket 16 and is aligned with the openings 42 and 44 of the walls 38 and 40 of the vehicle mounting bracket 16. In one embodiment, the pivot pin receiving member 18 is interchangeably referred to as a pivot tube. The pivot pin receiving member 18 may be made of steel material.

In one embodiment, the pivot pin receiving member 18 includes the pivot spacer engagement portion 98 at one end portion thereof, and an interlock connection portion 100 at the other end portion thereof.

In one embodiment, the pivot spacer engagement portion 98 of the pivot pin receiving member 18 is configured to engage with the pivot pin receiving member engagement portion 96 of the pivot spacer 54 at adjacent axial ends thereof. In one embodiment, the pivot pin receiving member engagement portion 96 of the pivot spacer 54 is configured to ensure tight fit/proper engagement with the pivot spacer engagement portion 98 of the pivot pin receiving member 18.

In one embodiment, the interlock connection portion 100 of the pivot pin receiving member 18 forms part of the interlock connection 28. In one embodiment, the interlock connection portion 100 includes machined knurls (protruding ribs, protruding ridges or serrations) thereon. In another embodiment, the interlock connection portion 100 is configured to engage with the machined knurls formed on the pivot pin 20.

In one embodiment, the machines knurls of the present patent application are axially aligned either on the inner surface of the pivot pin receiving member 18 or the outer surface of the pivot pin 20 at their respective interlock connection portions that form the interlock connection 28. The axial alignment of the knurls (i.e., parallel to the axis of the pivot pin receiving member 18 and the pivot pin 20) is configured to avoid any relative turning motion between the pivot pin receiving member 18 and the pivot pin 20 during the axial fitting of the pivot pin 20 into the pivot pin receiving member 18. It also ensures that the pivot pin receiving member 18 and the pivot pin 20 pivot together.

In one embodiment, the pivot pin 20 is at least partially and axially received by the pivot pin receiving member 18 and is configured to pivotally connect the pedal arm 12 and the vehicle mounting bracket 16. In one embodiment, the pivot pin is interchangeably referred to as a pivot member. The pivot pin may be made of steel material.

In one embodiment, the pivot pin receiving member 18 and the pivot pin 20 are mechanically coupled to one another via the interlock connection 28 therebetween to simultaneously pivot together as a unit during movement of the pedal arm 12 between the first arm position and the second arm position.

In one embodiment, the pivot pin 20 includes a flanged head portion 74, a shank portion 76 and a threaded portion 78. In one embodiment, the shank portion 76 includes a first diameter portion 80, an interlock connection portion 60, a second diameter portion 82, and a third diameter portion 84. The first through third diameter portions 80, 82, 84 are of progressively smaller diameter in a stepped configuration in the illustrated embodiment.

In one embodiment, the first diameter portion 80 of the pivot pin 20 includes a first diameter dimension. In one embodiment, the first diameter dimension of the first diameter portion 80 is smaller than the diameter of an inner surface 86 of the opening 66 of the vehicle mounting bracket 16. In one embodiment, the pivot bushing 46 is received in a clearance (i.e., the difference between the diameters of the inner surface 86 of the vehicle mounting bracket 16 and the first diameter portion 80) between the vehicle mounting bracket 16 and the pivot pin 20.

In one embodiment, the interlock connection portion 60 on the pivot pin 20 includes machined knurls 68 thereon, which engage with the machined knurls within the axial end of the pivot pin receiving member 18. In some embodiments, knurls may only be present on one part (e.g., the pivot pin 20) and forcibly engage the surface of the other. In one embodiment, the interlock connection portion 60 is disposed between the first diameter portion 80 and the second diameter portion 82.

In one embodiment, the second diameter portion 82 of the pivot pin 20 includes a second diameter dimension. In one embodiment, the second diameter dimension is smaller than the first diameter dimension. In one embodiment, the second diameter dimension of the second diameter portion 82 of the pivot pin 20 is configured to fit within the opening 66 of the pivot pin receiving member 18.

In one embodiment, the third diameter portion 84 of the pivot pin 20 includes a third diameter dimension. In one embodiment, the third diameter dimension is smaller than the second diameter dimension. In one embodiment, the third diameter dimension of the third diameter portion 84 of the pivot pin 20 is configured to fit within the opening 54 of the pivot spacer 54.

In one embodiment, the threaded end portion 78 of the pivot pin 20 is configured to engage with a pivot nut 90. In one embodiment, the threaded portion 78 includes has external threads that match internal threads of the pivot nut 90. In one embodiment, the threaded portion 78 includes has internal threads that match external threads of the pivot nut 90. In one embodiment, the pivot nut is made of steel material. In one embodiment, the threaded portion 78 of the pivot pin 20 is disposed on the same side of the pivot pin as the pivot spacer 54.

In one embodiment, the interlock connection 28 is a mechanical interlock connection formed between the pivot pin receiving member 18 and the pivot pin 20. When the pivot pin 20 is installed in the pivot pin receiving member 18, at least a portion of the pivot pin receiving member 18 or the pivot pin 20 is configured for deformation so as to achieve a secure interlock connection between the pivot pin receiving member 18 and the pivot pin 20. In one embodiment, the pedal assembly 10 includes the mechanical, interlock connection 28 between the pivot tube and the pivot pin so as to cause the pivot pin 20 and the pivot pin receiving member 18 to rotate as one/single unit.

In one embodiment, the pedal arm 12 is swaged, welded or otherwise connected to the pivot pin receiving member 18. In one embodiment, when the pedal arm 12 is rotated (e.g., depressed by the driver/user), it causes the pivot pin 20 and the pivot pin receiving member 18 to rotate together. In one embodiment, the pivot pin receiving member 18 has a unique feature (e.g., connector 72) that provides a mechanical output of the pedal operation to a sensor 62.

In one embodiment, at least a portion of the pivot pin receiving member 16 or the pivot pin 20 is configured deform to form the interlock connection 28 between the pivot pin receiving member 16 and the pivot pin 20.

In one embodiment, the interlock connection 28 includes the machined knurls 68 formed on an outer surface 64 of the pivot pin 20. When the pivot pin 20 is being inserted into or driven into the opening 66 of the pivot pin receiving member 18, the knurls 68 indent into an inner surface 70 of the pivot pin receiving member 18 to form the interlock connection 28 therebetween. In one embodiment, the interlock connection 28 is configured to prevent any relative turning/movement between the pivot pin 20 and the pivot pin receiving member 18. In one embodiment, the interlock connection 28 is also configured to resist any movement of the knurls 68 outwardly away from the pivot pin receiving member 18.

In one embodiment, the material of the pivot pin 20 having the knurls 68 thereon is harder than the material of the pivot pin receiving member 18 into which the knurls 68 are driven or inserted into. In such an embodiment, when the pivot pin 20 is being inserted into or driven into the opening 66 of the pivot pin receiving member 18, the material of the pivot pin receiving member 18 deforms. In one embodiment, such a deformation includes a plastic deformation. In one embodiment, the pivot pin receiving member 18 deforms to conform about the interlock connection portion (knurls) of the pivot pin 20 and to form the interlock connection 28. In one embodiment, the deformed material of the pivot pin receiving member 18 may flow into spaces of the valleys of the knurls of the interlock connection portion (knurls) of the pivot pin 20.

In another embodiment, the interlock connection 28 includes similar machined knurls formed on the inner surface 70 of the pivot pin receiving member 18.

When the pivot pin 20 is being inserted into or driven into the opening 66 of the pivot pin receiving member 18, the knurls on the pivot pin receiving member 18 indent into the outer surface 64 of the pivot pin 20 to form the interlock connection 28 therebetween. In one embodiment, the interlock connection 28 is configured to prevent any relative turning/movement therebetween. In one embodiment, the interlock connection 28 is also configured to resist any movement of the knurls outwardly away from the opening 66 of the pivot pin receiving member 18. In one embodiment, the material of the pivot pin receiving member 18 having the knurls therein is harder than the material of the pivot pin 20. In such an embodiment, when the pivot pin 20 is being inserted into or driven into the opening 66 of the pivot pin receiving member 18, the material of the pivot pin 20 plastically deforms. In one embodiment, the pivot pin 20 deforms to conform the interlock connection portion (knurls) of the pivot pin receiving member 18 and to form the interlock connection 28. In one embodiment, the deformed material of the pivot pin 20 may flow into spaces of the valleys of the knurls of the interlock connection portion (knurls) of the pivot pin receiving member 18. In one embodiment, the interlock connection 28 is a press fit connection.

In one embodiment, the knurls on one of the pivot pin receiving member 18 and the pivot pin 20 are configured to cut the material away and to locally deform the other of the pivot pin receiving member 18 and the pivot pin 20 at the peaks of the knurls. In one embodiment, the knurls on one of the pivot pin receiving member 18 and the pivot pin 20 are configured to not go through the entire thickness of the other of the pivot pin receiving member 18 and the pivot pin 20 during assembly.

In another embodiment, instead of machined knurls, at least a portion of the pivot pin 20 or the pivot pin receiving member 18 may include other (e.g., deformable) features that are configured to facilitate the formation of the interlock connection 28 between the pivot pin 20 and the pivot pin receiving member 18.

Figure 2:
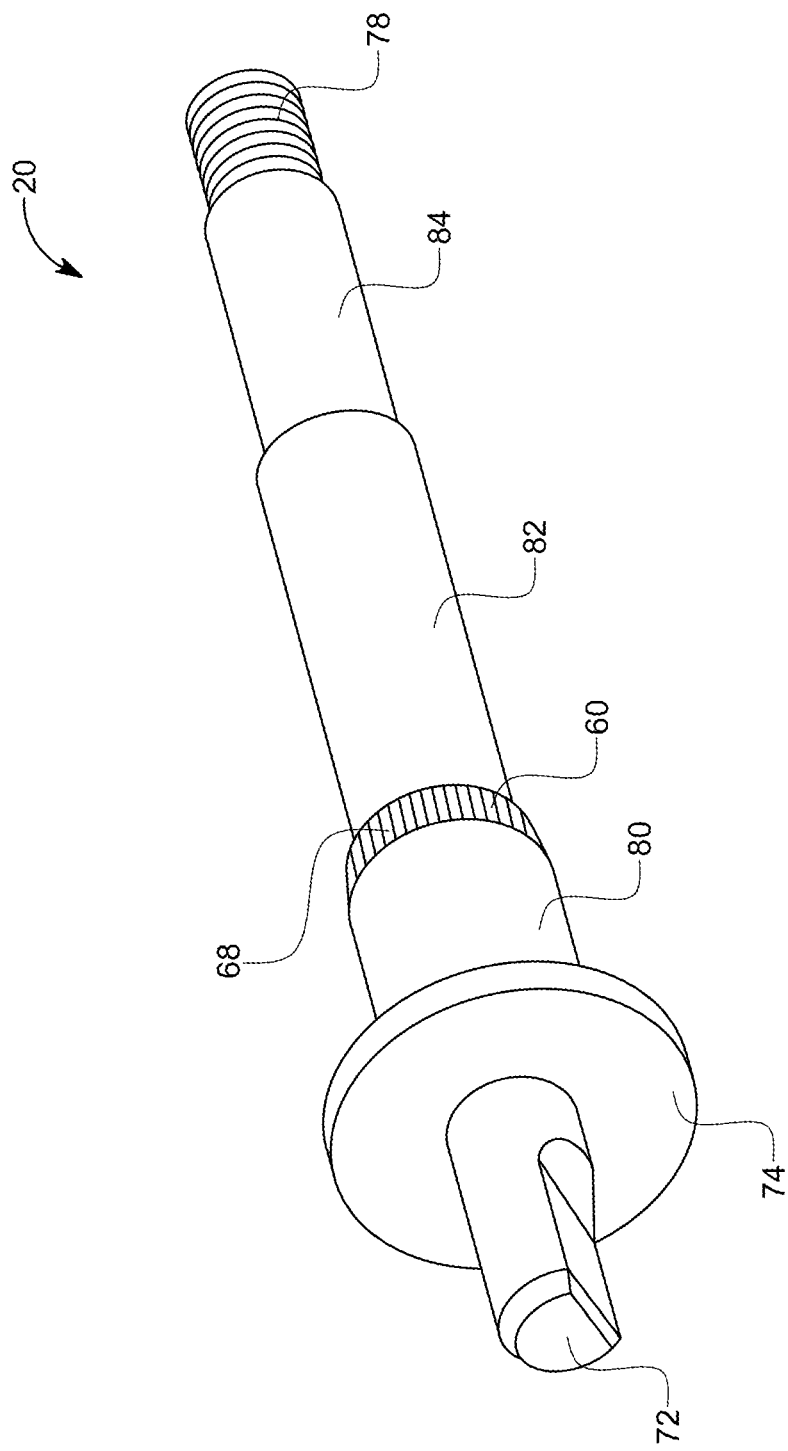
FIG. 2 shows a perspective view of the pivot pin of the pedal assembly in accordance with an embodiment of the present patent application.

In one embodiment, the pedal assembly 10 provides a direct interface at the pivot with the sensor 62. In one embodiment, the sensor 62 is a coaxial sensor. In one embodiment, the pivot pin 20 of the pedal assembly 10 includes a unique feature (e.g., connector 72) at end of the pivot pin 20 to interface with the sensor 62 and to drive the sensor 62. For example, the pedal assembly 10 includes the connector 72 for connection to the sensor 62 for detecting the pivotal movement. In one embodiment, as shown in FIG. 2, the connector 72 is an extruded feature on the pivot pin 20. In one embodiment, the connector 72 of the pivot pin 20 may be extruded feature from face of the pivot pin 20 to the interface with the sensor 62.

In one embodiment, the sensor 62 is a Brake Apply Sensor (BAS) device. The connector 72 is provided to connect the pedal assembly 10 to the BAS device 62. The connector 72 engages with the BAS device 62, causing it to rotate upon rotation of the pivot pin receiving member 18 and the pivot pin 20 (i.e., together as a unit). The BAS device 62 engages with the connector 72 and, as the pedal arm 12 rotates, the potentiometer in the sensor/BAS device 62 electronically transmits the position of the brake pedal 12 (e.g., its angle to determine how much is applied) for use by a controller or processor or other device in the vehicle, as understood in the art. Also, it should be noted that the pedal assembly 10 may also be used in combination with any number of sensing devices or sensors. For example, other additional or alternative sensing, electronic, or communication devices can be used with either or both pedal assemblies disclosed herein and are not limited to those that are illustrated in the Figures and described above.

Figure 4:
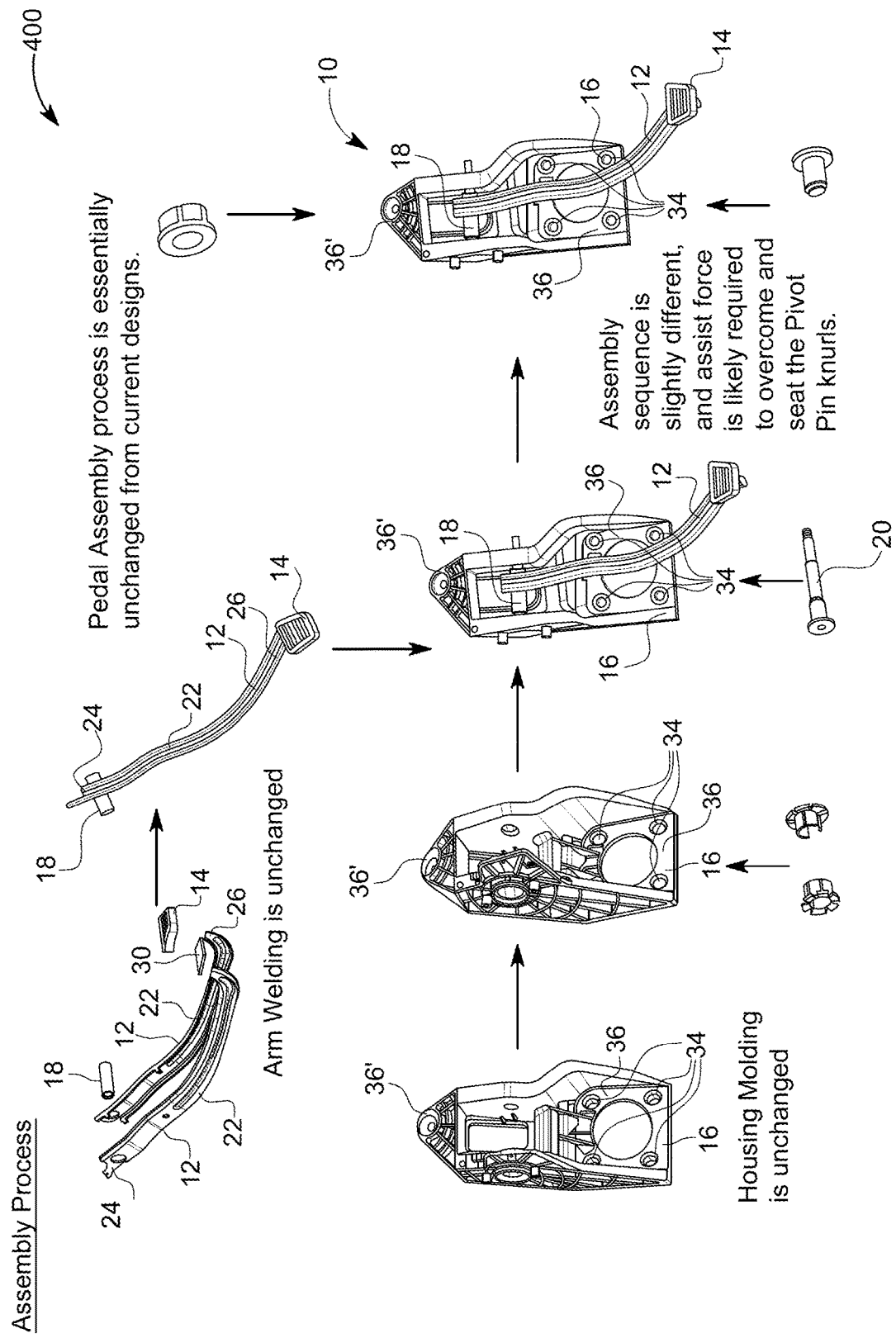
FIG. 4 shows a method of assembling the pedal assembly in accordance with an embodiment of the present patent application.

Referring to FIG. 4, a method 400 of assembling of the pedal assembly 10 is shown and described. In one procedure of the method 400, the pivot arm 12 and the pivot plate 14 are connected to each other. In one embodiment, the pivot arm 12 and the pivot plate 14 are welded to each other.

In next procedure of the method 400, the pivot arm 12 (with the pivot plate 14 connected thereto) is connected to the pivot pin receiving member 18 at the first end 24 of the pivot arm 12. In one embodiment, the pivot arm 12 (with the pivot plate 14 connected thereto) is welded to the pivot pin receiving member 18 at the first end 24 of the pivot arm 12. In alternative methods, the connection between the pivot pin receiving member 18 and the pivot arm 12 may take place at other times.

In next procedure of the method 400, the fasteners 46, 48 are disposed at the sides 50, 52 of the vehicle mounting bracket 16 and are interlocked with the openings 42 and 44 of the vehicle mounting bracket 16.

In next procedure of the method 400, the pivot pin receiving member 18 (with the pivot arm 12 and the pivot plate 14 connected thereto) is received between the walls 38 and 40 of the vehicle mounting bracket 16 and aligned with the openings 42 and 44 of the vehicle mounting bracket 16.

In next procedure of the method 400, the pivot pin 20 is aligned through the openings 42 and 44 of the vehicle mounting bracket 16 and through the opening 66 of the pivot pin receiving member 18.

In one embodiment, in the assembled configuration of the pedal assembly 10, portions of the head portion 74 of the pivot pin 20 and the first diameter portion 80 of the pivot pin 20 are configured engage with portions of the fastener 46. In one embodiment, in the assembled configuration of the pedal assembly 10, portions of the fastener 46 are also configured engage with portions of the vehicle mounting bracket 16.

In one embodiment, in the assembled configuration of the pedal assembly 10, portions of the head portion 92 of the pivot spacer 54 and the shank portion 94 of the pivot spacer 54 are configured engage with portions of the fastener 48. In one embodiment, in the assembled configuration of the pedal assembly 10, portions of the fastener 48 are also configured engage with portions of the vehicle mounting bracket 16. In one embodiment, in the assembled configuration of the pedal assembly 10, portions of the head portion 92 of the pivot spacer 54 and the shank portion 94 of the pivot spacer 54 are configured engage with portions of the third diameter portion 84 of the pivot pin 20.

In one embodiment, in the assembled configuration of the pedal assembly 10, the pivot spacer engagement portion 98 of the pivot pin receiving member 18 is configured to engage with the pivot pin receiving member engaging portion 96 of the pivot spacer 54. In one embodiment, in the assembled configuration of the pedal assembly 10, the threaded portion 78 of the pivot pin 20 is configured to engage with the pivot nut 90.

In one embodiment, an assist force is applied to overcome and seat the knurls 68 of the pivot pin 20 in the pivot pin receiving member 18. That is, inserting the pivot pin 20 into the pivot pin receiving member 18 along a direction of the axis such that the knurls on one of the pivot pin receiving member 18 and the pivot pin 20 deform the other the pivot pin receiving member 18 and the pivot pin 20 to conform about the knurls to form the interlock connection 28 between the pivot pin receiving member 18 and the pivot pin 20.

In one embodiment, a method of assembling a pedal assembly is provided. The pedal assembly comprises a pedal arm, a pedal plate, a vehicle mounting bracket, a pivot pin receiving member, and a pivot pin. The pedal arm comprises an elongated lever structure with a first end and a second end and configured for movement between a first arm position and a second arm position. The pedal plate is provided on the second end of the elongated lever structure of the pedal arm for depression by a foot of a driver of the vehicle. The vehicle mounting bracket comprises spaced-apart walls with openings formed therein. The pivot pin receiving member is configured for pivoting relative to the vehicle mounting bracket about a pivot axis. The pivot pin is configured to pivotally connect the pedal arm and the vehicle mounting bracket. The method comprises connecting the first end of the pedal arm to the pivot pin receiving member to provide pivotal movement to the pivot pin receiving member during movement of the pedal arm between the first arm position and the second arm position; disposing the pivot pin receiving member between the walls of the vehicle mounting bracket such that an opening of the pivot pin receiving member is aligned with the openings in the walls; inserting the pivot pin into the pivot pin receiving member along an axial direction of the pivot pin and through the aligned openings in the walls and the opening of the pivot pin receiving member such that an interlock connection portion of one of the pivot pin and the pivot pin receiving member deforms an interlock connection portion of the other of the pivot pin and the pivot pin receiving member to form an interlock connection between the pivot pin receiving member and the pivot pin.

The present patent application relates generally to the pedal assembly or pedal pivot structure 10 for coaxial sensor (PPS). It provides a mechanism that links the pedal assembly 10 to the position detection device or sensor 62. In one embodiment, the sensor 62 is configured to translate a mechanical output of the position of the pedal arm 12 though the entire range of motion of the pedal arm 12. In one embodiment, the mechanical output is then configured to be translated for into an electronic signal for use in pedal application sensing, regenerative braking systems, brake light activation, cruise control deactivation, and/or next generation vehicles. In one embodiment, the pedal assembly 12 for the coaxial sensor 62 is configured to be retained either by a threaded pivot pin and nut, or by spun rivet feature.

In one embodiment, unlike existing/prior art pedal assembly, the pedal assembly of the present patent application does not need additional switch flag and sensor bracket. Thus, there is less chance of the pedal assembly of the present patent application being damaged during handling. Also, as additional switch flag and sensor bracket are not needed, the pedal assembly of the present patent application includes lesser manufacturing processes.

In one embodiment, unlike existing/prior art pedal assembly, the pedal assembly of the present patent application does not need additional brake apply sensor (BAS) (i.e., traditional or commonly used sensors that cannot be mounted coaxially with the pivot) pin to be added to the brake pedal arm. Thus, there is a less chance of the pin being damaged during shipping as this is a high warranty item. In one embodiment, unlike existing/prior art pedal assembly, the pedal assembly of the present patent application has a direct connection or interface to a coaxial sensor. Thus, there is reduction of additional pedal components in the pedal assembly of the present patent application. In one embodiment, alternatives to the pedal assembly for coaxial sensors include traditional plunger type switches or sensor, rotary sensors mounted away from the pivot requiring complex structures, or non-traditional methods for rotating the pedal arm itself.

In one embodiment, a controller (not shown) may be associated with the pedal assembly for controlling and/or adjusting the pivot position of the pedal. In one embodiment, an adjuster mechanism (not shown) may also or alternatively be included. For example, the controller may drive the pedal assembly between at least its first and second positions. In one embodiment, the controller and/or adjuster system may include a motor (e.g., DC motor) and a gearing system. The gearing system may be the gearing system that is connected to the accelerator pedal assembly, for example, which is designed to also drive the disclosed mechanism on the brake pedal (or clutch, or accelerator pedal). When a driver operates a switch in the vehicle, for example, the controller may command the motor to move and drive the system (e.g., between a first pedal position and a second pedal position).

Although the present patent application has been described in detail for the purpose of illustration, it is to be understood that such detail is solely for that purpose and that the present patent application is not limited to the disclosed embodiments, but, on the contrary, is intended to cover modifications and equivalent arrangements that are within the spirit and scope of the appended claims. In addition, it is to be understood that the present patent application contemplates that, to the extent possible, one or more features of any embodiment can be combined with one or more features of any other embodiment.

The illustration of the embodiments of the present patent application should not be taken as restrictive in any way since a myriad of configurations and methods utilizing the present patent application can be realized from what has been disclosed or revealed in the present patent application. The systems, features and embodiments described in the present patent application should not be considered as limiting in any way. The illustrations are representative of possible construction and mechanical embodiments and methods to obtain the desired features. The location and/or the form of any minor design detail or the material specified in the present patent application can be changed and doing so will not be considered new material since the present patent application covers those executions in the broadest form.

The foregoing illustrated embodiments have been provided to illustrate the structural and functional principles of the present patent application and are not intended to be limiting. To the contrary, the present patent application is intended to encompass all modifications, alterations and substitutions within the spirit and scope of the appended claims.

What is claimed is:

1. A pedal assembly for operating a push rod that activates a functional system of a vehicle, the pedal assembly comprising:
   a pedal arm comprising an elongated lever structure with a first end and a second end and configured for movement between a first arm position and a second arm position;
   a pedal plate provided on the second end of the elongated lever structure of the pedal arm for depression by a foot of a driver of the vehicle;
   a vehicle mounting bracket;
   a pivot pin receiving member configured for pivoting relative to the vehicle mounting bracket about a pivot axis, the first end of the pedal arm being operatively connected to the pivot pin receiving member to provide pivotal movement to the pivot pin receiving member during movement of the pedal arm between the first arm position and the second arm position; and
   a pivot pin at least partially and axially received by the pivot pin receiving member and configured to pivotally connect the pedal arm and the vehicle mounting bracket;
   wherein the pivot pin receiving member and the pivot pin are mechanically coupled to one another via an interlock connection therebetween to simultaneously pivot together about the pivot axis as a unit during movement of the pedal arm between the first arm position and the second arm position,
   wherein at least a portion of the pivot pin receiving member or the pivot pin is deformed to form the interlock connection between the pivot pin receiving member and the pivot pin, and
   wherein the pivot pin comprises a connector for connection to a sensor for detecting the movement of the movement of the pedal arm between the first arm position and the second arm position.

2. The pedal assembly of claim 1, wherein the vehicle mounting bracket comprises spaced-apart walls with openings formed therein,
   wherein the pivot pin receiving member is aligned with the openings in the walls and is disposed between the walls such that an opening of the pivot pin receiving member is aligned with the openings in the walls, and
   wherein the pivot pin is inserted through the aligned openings in the walls and the opening of the pivot pin receiving member.

3. The pedal assembly of claim 1, further comprising pivot bushings disposed on walls of the vehicle mounting bracket,
   wherein the pivot bushings are configured to be fixed against pivotal rotation, while permitting pivoting of the pivot pin therein.

4. The pedal assembly of claim 1, wherein the interlock connection between the pivot pin receiving member and the pivot pin includes:
   a first interlock connection portion disposed on one of an outer peripheral surface of the pivot pin and an inner peripheral surface of the pivot pin receiving member, and
   a second interlock connection portion disposed on the other of the outer peripheral surface of the pivot pin and the inner peripheral surface of the pivot pin receiving member,
   wherein one of the first interlock connection portion and the second interlock connection portion deforms the other of the first interlock connection portion and the second interlock connection portion to form the interlock connection between the pivot pin receiving member and the pivot pin.

5. A pedal assembly for operating a push rod that activates a functional system of a vehicle, the pedal assembly comprising:
   a pedal arm comprising an elongated lever structure with a first end and a second end and configured for movement between a first arm position and a second arm position;

a pedal plate provided on the second end of the elongated lever structure of the pedal arm for depression by a foot of a driver of the vehicle;

a vehicle mounting bracket;

a pivot pin receiving member configured for pivoting relative to the vehicle mounting bracket about a pivot axis, the first end of the pedal arm being operatively connected to the pivot pin receiving member to provide pivotal movement to the pivot pin receiving member during movement of the pedal arm between the first arm position and the second arm position; and a pivot pin at least partially and axially received by the pivot pin receiving member and configured to pivotally connect the pedal arm and the vehicle mounting bracket;

wherein the pivot pin receiving member and the pivot pin are mechanically coupled to one another via an interlock connection therebetween to simultaneously pivot together about the pivot axis as a unit during movement of the pedal arm between the first arm position and the second arm position, wherein at least a portion of the pivot pin receiving member or the pivot pin is deformed to form the interlock connection between the pivot pin receiving member and the pivot pin, and wherein a portion of the pivot pin includes knurled portion and at least the portion of the pivot pin receiving member engages with the knurled portion of the pivot pin and is deformed by the knurled portion to form the interlock connection between the pivot pin receiving member and the pivot pin.

6. The pedal assembly of claim 5, wherein the pivot pin and the pivot pin receiving member are made of steel material.

7. The pedal assembly of claim 5, wherein the interlock connection between the pivot pin receiving member and the pivot pin is configured to prevent any relative turning or movement between the pivot pin and the pivot pin receiving member.

8. The pedal assembly of claim 5, wherein the pivot pin receiving member includes an inner peripheral surface, wherein the pivot pin includes an outer peripheral surface, and wherein the interlock connection is formed between the outer peripheral surface of the pivot pin and the inner peripheral surface of the pivot pin receiving member.

9. A pedal assembly for operating a push rod that activates a functional system of a vehicle, the pedal assembly comprising:

a pedal arm comprising an elongated lever structure with a first end and a second end and configured for movement between a first arm position and a second arm position;

a pedal plate provided on the second end of the elongated lever structure of the pedal arm for depression by a foot of a driver of the vehicle;

a vehicle mounting bracket;

a pivot pin receiving member configured for pivoting relative to the vehicle mounting bracket about a pivot axis, the first end of the pedal arm being operatively connected to the pivot pin receiving member to provide pivotal movement to the pivot pin receiving member during movement of the pedal arm between the first arm position and the second arm position; and a pivot pin at least partially and axially received by the pivot pin receiving member and configured to pivotally connect the pedal arm and the vehicle mounting bracket;

wherein the pivot pin receiving member and the pivot pin are mechanically coupled to one another via an interlock connection therebetween to simultaneously pivot together about the pivot axis as a unit during movement of the pedal arm between the first arm position and the second arm position, wherein at least a portion of the pivot pin receiving member or the pivot pin is deformed to form the interlock connection between the pivot pin receiving member and the pivot pin, and wherein a portion of the pivot pin receiving member includes knurled portion and at least the portion of the pivot pin engages with the knurled portion of the pivot pin receiving member and is deformed by the knurled portion to form the interlock connection between the pivot pin receiving member and the pivot pin.

10. A pedal assembly for operating a push rod that activates a functional system of a vehicle, the pedal assembly comprising:

a pedal arm comprising an elongated lever structure with a first end and a second end and configured for movement between a first arm position and a second arm position;

a pedal plate provided on the second end of the elongated lever structure of the pedal arm for depression by a foot of a driver of the vehicle;

a vehicle mounting bracket;

a pivot pin receiving member configured for pivoting relative to the vehicle mounting bracket about a pivot axis, the first end of the pedal arm being operatively connected to the pivot pin receiving member to provide pivotal movement to the pivot pin receiving member during movement of the pedal arm between the first arm position and the second arm position; and a pivot pin at least partially and axially received by the pivot pin receiving member and configured to pivotally connect the pedal arm and the vehicle mounting bracket;

wherein the pivot pin receiving member and the pivot pin are mechanically coupled to one another via an interlock connection therebetween to simultaneously pivot together about the pivot axis as a unit during movement of the pedal arm between the first arm position and the second arm position, wherein at least a portion of the pivot pin receiving member or the pivot pin is deformed to form the interlock connection between the pivot pin receiving member and the pivot pin, and further comprising a pivot spacer, wherein, at one side, the pivot pin is interlocked by insertion of the pivot pin into the vehicle mounting bracket in one direction, and wherein, at the other side, the pivot pin is interlocked by the pivot spacer being inserted in the opposite direction such that the pivot spacer and the pivot pin pivot together.

11. The pedal assembly of claim 10, wherein the pivot pin includes a threaded portion configured to engage with a pivot nut to further interlock the pivot pin at the other side, and wherein the threaded portion is disposed on the same side of the pivot pin as the pivot spacer.

12. The pedal assembly of claim 10, wherein the pivot spacer is made of steel material.

13. A pedal assembly for operating a push rod that activates a functional system of a vehicle, the pedal assembly comprising:
- a pedal arm comprising an elongated lever structure with a first end and a second end and configured for movement between a first arm position and a second arm position;
- a pedal plate provided on the second end of the elongated lever structure of the pedal arm for depression by a foot of a driver of the vehicle;
- a vehicle mounting bracket;
- a pivot pin receiving member configured for pivoting relative to the vehicle mounting bracket about a pivot axis, the first end of the pedal arm being operatively connected to the pivot pin receiving member to provide pivotal movement to the pivot pin receiving member during movement of the pedal arm between the first arm position and the second arm position; and
- a pivot pin at least partially and axially received by the pivot pin receiving member and configured to pivotally connect the pedal arm and the vehicle mounting bracket;

wherein the pivot pin receiving member and the pivot pin are mechanically coupled to one another via an interlock connection therebetween to simultaneously pivot together about the pivot axis as a unit during movement of the pedal arm between the first arm position and the second arm position, wherein at least a portion of the pivot pin receiving member or the pivot pin is deformed to form the interlock connection between the pivot pin receiving member and the pivot pin, wherein the pivot pin receiving member and the pivot pin are made from same material but having different material hardnesses, and wherein one of the pivot pin receiving member and the pivot pin that is deformed to form the interlock connection between the pivot pin receiving member and the pivot pin has a material hardness lower than the other of the pivot pin receiving member and the pivot pin.

* * * * *